(12) United States Patent
Konowalczyk

(10) Patent No.: US 12,123,656 B2
(45) Date of Patent: Oct. 22, 2024

(54) METHODS AND SYSTEMS AND APPARATUS TO SUPPORT REDUCED ENERGY AND WATER USAGE

(71) Applicant: OCTOPUS ENERGY HEATING LIMITED, London (GB)

(72) Inventor: Peter Konowalczyk, London (GB)

(73) Assignee: OCTOPUS ENERGY HEATING LIMITED, London (GB)

( * ) Notice: Subject to any disclaimer, the term of this patent is extended or adjusted under 35 U.S.C. 154(b) by 0 days.

(21) Appl. No.: 18/275,917

(22) PCT Filed: Feb. 7, 2022

(86) PCT No.: PCT/IB2022/051055
§ 371 (c)(1),
(2) Date: Aug. 4, 2023

(87) PCT Pub. No.: WO2022/168027
PCT Pub. Date: Aug. 11, 2022

(65) Prior Publication Data
US 2024/0201714 A1   Jun. 20, 2024

(30) Foreign Application Priority Data

Feb. 7, 2021 (GB) ...................................... 2101678
Jul. 2, 2021 (GB) ...................................... 2109593
(Continued)

(51) Int. Cl.
*F28D 20/00* (2006.01)
*F24D 11/00* (2022.01)
(Continued)

(52) U.S. Cl.
CPC ........ *F28D 20/0034* (2013.01); *F24D 11/003* (2013.01); *F24D 11/02* (2013.01);
(Continued)

(58) Field of Classification Search
None
See application file for complete search history.

(56) References Cited

U.S. PATENT DOCUMENTS 4,798,059 A    1/1989  Morita
2010/0313958 A1*  12/2010  Patel ....................... E03B 7/071
                                                                137/552
(Continued)

FOREIGN PATENT DOCUMENTS

CN    201191144 Y    2/2009
CN    201265954 Y    7/2009
(Continued)

OTHER PUBLICATIONS

PCT International Search Report and Written Opinion dated May 20, 2022, PCT International Application No. PCT/IB2022/051055, pp. 1-9.

*Primary Examiner* — David Earl Ogg
(74) *Attorney, Agent, or Firm* — Resolute Legal PLLC

(57) ABSTRACT

Disclosed is a method of mapping an in-building water supply installation having multiple controllable water outlets, the installation including a supply of water; in a water flow path between the supply of water and the controllable water outlets, a flow measurement device and a flow regulator; a processor being operatively connected to the flow measurement device and the at least one flow regulator. The method comprises opening a first of the water outlets and processing signals from the flow measurement device with the processor at least until a first flow characteristic is determined; closing the first of the water outlets; repeating the opening, processing and closing operations for each of the other water outlets to determine for each controllable water outlet a respective flow characteristic. Subsequently the processor is configured to; identify the opening of a particular one of the plurality of controllable water outlets (Continued)

based on the similarity of a detected flow characteristic to a respective flow characteristic; and control said at least one flow regulator, based on the identification, to control a supply of water to the identified controllable water outlet.

20 Claims, 3 Drawing Sheets

(30) Foreign Application Priority Data

| | | | |
|---|---|---|---|
| Jul. 2, 2021 | (GB) | ...................................... | 2109594 |
| Jul. 2, 2021 | (GB) | ...................................... | 2109596 |
| Jul. 2, 2021 | (GB) | ...................................... | 2109597 |
| Jul. 2, 2021 | (GB) | ...................................... | 2109598 |
| Jul. 2, 2021 | (GB) | ...................................... | 2109599 |
| Jul. 2, 2021 | (GB) | ...................................... | 2109600 |

(51) Int. Cl.

| | |
|---|---|
| *F24D 11/02* | (2006.01) |
| *F24D 17/02* | (2006.01) |
| *F24D 19/10* | (2006.01) |
| *F24H 15/212* | (2022.01) |
| *F24H 15/238* | (2022.01) |
| *F24H 15/31* | (2022.01) |
| *F28D 20/02* | (2006.01) |
| *G05D 7/06* | (2006.01) |

(52) U.S. Cl.
CPC .......... *F24D 17/02* (2013.01); *F24D 19/1054* (2013.01); *F24H 15/212* (2022.01); *F24H 15/238* (2022.01); *F24H 15/31* (2022.01); *F28D 20/021* (2013.01); *G05D 7/0682* (2013.01); *F24D 2200/08* (2013.01); *F24D 2200/12* (2013.01); *F24D 2200/14* (2013.01); *F24D 2220/042* (2013.01); *F24D 2220/044* (2013.01); *F24D 2220/10* (2013.01); *F28D 2020/0078* (2013.01); *F28D 2020/0082* (2013.01)

(56) References Cited

U.S. PATENT DOCUMENTS

| | | | |
|---|---|---|---|
| 2011/0271953 A1 | 11/2011 | Wortmann et al. | |
| 2016/0041565 A1* | 2/2016 | Edwards | ................. G01M 3/00 |
| | | | 700/282 |
| 2018/0038616 A1 | 2/2018 | Scheers et al. | |
| 2018/0143059 A1* | 5/2018 | Tahan | ................. G01F 15/0755 |
| 2021/0318027 A1 | 10/2021 | Boros et al. | |

FOREIGN PATENT DOCUMENTS

| | | | | |
|---|---|---|---|---|
| CN | 203758014 U | | 8/2014 | |
| CN | 111189348 A | * | 5/2020 | |
| CN | 111750528 A | | 10/2020 | |
| CN | 111811142 A | | 10/2020 | |
| DE | 29921889 U1 | | 6/2000 | |
| DE | 10006564 A1 | | 8/2000 | |
| DE | 10151253 C1 | | 11/2002 | |
| DE | 202007011183 U1 | * | 12/2007 | ......... F24D 19/1051 |
| DE | 102014225693 A1 | | 6/2016 | |
| EP | 0007538 A1 | | 2/1980 | |
| EP | 0446862 A2 | | 9/1991 | |
| EP | 1684035 A2 | | 7/2006 | |
| EP | 3121522 A1 | | 1/2017 | |
| EP | 3564593 A2 | | 11/2019 | |
| JP | S5795534 A | | 6/1982 | |
| JP | S5812992 A | | 1/1983 | |
| JP | H01256792 A | | 10/1989 | |
| JP | H1144495 A | | 2/1999 | |
| JP | 2012002469 A | | 1/2012 | |
| KR | 20100030141 A | | 3/2010 | |
| WO | 2010046306 A2 | | 4/2010 | |
| WO | 2020209979 A2 | | 10/2020 | |

\* cited by examiner

METHODS AND SYSTEMS AND APPARATUS TO SUPPORT REDUCED ENERGY AND WATER USAGE

CROSS REFERENCE TO RELATED APPLICATION

This application is a National Stage Application of International Application No. PCT/IB2022/051055 filed Feb. 7, 2022, which claims the benefit and priority of UK Patent Application No. 2109600.3, filed Jul. 2, 2021, UK Patent Application No. 2109599.7 filed Jul. 2, 2021, UK Patent Application No. 2109598.9, filed Jul. 2, 2021, UK Patent Application No. 2109597.1, filed Jul. 2, 2021, UK Patent Application No. 2109596.3, filed Jul. 2, 2021, UK Patent Application No. 2109594.8, filed Jul. 2, 2021, UK Patent Application No. 2109593.0, filed Jul. 2, 2021 and UK Patent Application No. 2101678.7, filed Feb. 7, 2021, the disclosures of which are incorporated by reference herein in their entirety as part of the present application.

TECHNICAL FIELD

The present disclosure variously relates to methods, systems and apparatus for use in helping consumers reduce their water consumption and their energy usage.

BACKGROUND

Worldwide, there is a shortage of potable water. Water shortages are now commonly reported around the world, and although it might be thought that such issues only affect "hot" countries and continents, that is no longer the case. The European Environment Agency reports that water shortages or water stress is a problem that affects millions of people around the world, including over 100 Million people in Europe. About 88.2% of Europe's freshwater use (drinking and other uses) comes from rivers and groundwater, while the rest comes from Reservoirs (10.3%) and Lakes (1.5%), which makes these sources extremely vulnerable to threats posed by over-exploitation, pollution and climate change.

Consequently, there is an urgent need reduce domestic water usage. In Europe, on average, 144 litres of freshwater per person per day is supplied for household consumption, but much of this water is "wasted" through carelessness and poor choices of taps, showers, and appliances.

Allied to the need to reduce water consumption is the need to reduce domestic energy consumption, particularly given that (at least in Europe) around 75% of heating and cooling is still generated from fossil fuels while only 22% is generated from renewable energy.

According to Directive 2012/27/EU buildings represent 40% of the final energy consumption and 36% of $CO_2$ emissions. The EU Commission report of 2016 "Mapping and analyses of the current and future (2020-2030) heating/cooling fuel deployment (fossil/renewables)" concluded that in EU households, heating and hot water alone account for 79% of total final energy use (192.5 Mtoe). To fulfil the EU's climate and energy goals, the heating and cooling sector must sharply reduce its energy consumption and cut its use of fossil fuels. Heat pumps (with energy drawn from the air, the ground or water) have been identified as potentially significant contributors in addressing this problem.

In many countries, there are policies and pressures to reduce carbon footprint. For example, in the UK in 2020 the UK Government published a whitepaper on a Future Homes Standard, with proposals to reduce carbon emissions from new homes by 75 to 80% compared to existing levels by 2025. In addition, it was announced in early 2019 that there would be a ban on the fitment of gas boilers to new homes from 2025. It is reported that in the UK at the time of filing 78% of the total energy used for the heating of buildings comes from gas, while 12% comes from electricity.

The UK has a large number of small, 2-3 bedroom or less, properties with gas-fired central heating, and most of these properties use what are known as combination boilers, in which the boiler acts as an instantaneous hot water heater, and as a boiler for central heating. Combination boilers are popular because they combine a small form factor, provide a more or less immediate source of "unlimited" hot water (with 20 to 35 kW output), and do not require hot water storage. Such boilers can be purchased from reputable manufactures relatively inexpensively. The small form factor and the ability to do without a hot water storage tank mean that it is generally possible to accommodate such a boiler even in a small flat or house—often wall-mounted in the kitchen, and to install a new boiler with one man day's work. It is therefore possible to get a new combi gas boiler installed inexpensively. With the imminent ban on new gas boilers, alternative heat sources will need to be provided in place of gas combi boilers. In addition, previously fitted combi boilers will eventually need to be replaced with some alternative.

Although heat pumps have been proposed as a potential solution to the need to reduce reliance on fossil fuels and cut $CO_2$ emissions, they are currently unsuited to the problem of replacing gas fired boilers in smaller domestic (and small commercial) premises or a number of technical, commercial and practical reasons. They are typically very large and need a substantial unit on the outside of the property. Thus they cannot easily be retro-fitted into a property with a typical combi boiler. A unit capable of providing equivalent output to a typical gas boiler would currently be expensive and may require significant electrical demand. Not only do the units themselves cost multiples of the equivalent gas fired equivalent, but also their size and complexity means that installation is technically complex and therefore expensive. A further technical problem is that heat pumps tend to require a significant time to start producing heat in response to demand, perhaps 30 seconds for self-checking then some time to heat up—so a delay of 1 minute or more between asking for hot water and its delivery. For this reason attempted renewable solutions using heat pumps and/or solar are typically applicable to large properties with room for a hot water storage tank (with space demands, heat loss and legionella risk).

There therefore exists a need to provide a solution to the problem of finding a suitable technology to replace gas combi boilers, particularly for smaller domestic dwellings.

Other concerns also arise from the need to reduce the amount of carbon dioxide released into the atmosphere and more generally to reduce the amount of energy wasted by households. Significant among these is the need to reduce the amount of hot water used by households, which is also a significant consideration given the worldwide need to reduce the demand for water.

Aspects of the present disclosure concern methods and installations that can help to reduce usage of hot water, and in this way contribute to a reduction in the usage of both energy and water.

SUMMARY

In a first aspect there is provided a method of mapping an in-building water supply installation having a plurality of controllable water outlets, the installation including:

a supply of water;
in a water flow path between the supply of water and the plurality of controllable water outlets, at least one flow measurement device and at least one flow regulator;
a processor operatively connected to the at least one flow measurement devices and the at least one flow regulator; the method comprising:
opening a first of the plurality of controllable water outlets and processing signals from the at least one flow measurement device with the processor at least until a first flow characteristic is determined;
closing the first of the plurality of controllable water outlets;
repeating the opening, processing and closing operations for each of the other controllable water outlets of the plurality to determine for each controllable water outlet a respective flow characteristic;
subsequently configuring the processor to:
identify the opening of a particular one of the plurality of controllable water outlets based on the similarity of a detected flow characteristic to a respective flow characteristic; and
control said at least one flow regulator, based on the identification, to control a supply of water to the identified controllable water outlet.

The processor may be coupled to a radio frequency transmitter, the method then further comprising the processor sending a series of signals to the radio frequency transmitter, each of the signals causing the radio frequency transmitter to transmit a signal instructing the opening of a different one of the plurality of controllable hot-water outlets.

In addition, or alternatively, the processor may be processor is coupled to a radio frequency receiver, the method then further comprising receiving at the processor a series of signal from the radio frequency receiver, each of the received signals corresponding to the opening of a different one of the plurality of controllable water outlets. Each received signal may include a time stamp related to the opening of the relevant one of the plurality of controllable water outlets.

Preferably, each of the respective flow characteristic includes a respective stable flow rate. The method may further comprise configuring the processor to control the at least one flow regulator to impose at least a 10% cut in the flow rate to each of each of the plurality of controllable water outlets, based on the respective stable flow rate. The method may further comprise configuring the processor to control the at least one flow regulator to impose at least a 10% cut in the flow rate, based on respective stable flow rate, to any of the plurality of controllable water outlets whose respective stable flow rate is greater than 7 litres per minute.

The method may further comprise configuring the processor to control the at least one flow regulator to cap the flow rate to each of the plurality of controllable water outlets at no more than 7 litres per minute. The supply of water may be a supply of hot water, and the water in the supply may be heated by a heat pump.

The supply of water may be a supply of cold water.

The installation may include both a supply of cold water and a supply of hot water, and the method of the first aspect may be performed in respect of both the hot water supply and the cold water supply.

In a second aspect there is provided a method of controlling usage of water from an in-building water supply installation, the installation including:
a supply of water;
in a water flow path between the supply of water and the plurality of controllable water outlets, at least one flow measurement device and at least one flow regulator;
a processor operatively connected to the at least one flow measurement device and the at least one flow regulator, the processor having been configured using the method of the first aspect; the method of controlling usage comprising:
identifying with the processor the opening of a particular one of the plurality of controllable water outlets based on the similarity of a detected flow characteristic to a respective flow characteristic; and
controlling with the processor said at least one flow regulator, based on the identification, to control a supply of water to the identified controllable water outlet.

Each of the respective flow characteristic may include a respective stable flow rate, and the method may further comprise using the processor to control the at least one flow regulator to impose at least a 10% cut in the flow rate to each of each of the plurality of controllable water outlets, based on the respective stable flow rate.

Each of the respective flow characteristic may include a respective stable flow rate, and the method may further comprise using the processor to control the at least one flow regulator to impose at least a 10% cut in the flow rate, based on respective stable flow rate, to any of the plurality of controllable water outlets whose respective stable flow rate is greater than 7 litres per minute.

The processor may further be configured to control the at least one flow regulator to cap the flow rate to each of the plurality of controllable water outlets at no more than 7 litres per minute.

The supply of water may be a supply of hot water.

The supply of water may be a supply of cold water.

The installation may include both a supply of cold water and a supply of hot water, and the method may be performed in respect of both the hot water supply and the cold water supply.

In a third aspect there is provided a processor and memory for use in mapping an in-building water supply installation having:
a source of water;
a plurality of controllable water outlets coupled to the source of water;
in a water flow path between the source of water and the plurality of controllable water outlets, at least one flow measurement device and at least one flow regulator;
the processor being configured for operative connection to the at least one flow measurement device and the at least one flow regulator;
and the memory, operatively coupled to the processor, storing instructions that cause the processor to perform a method of mapping the water supply installation in which method the processor:
processes signals received from the at least one flow measurement device consequent on the opening of a first of the plurality of controllable water outlets at least until a first flow characteristic is determined;
after the closing of the first of the plurality of controllable water outlets;
repeating the operations for each of the other controllable water outlets of the plurality to determine for each controllable water outlets a respective flow characteristic;
thereafter, the processor being configured to:

identify the opening of a particular one of the plurality of controllable water outlets based on the similarity of a detected flow characteristic to a respective flow characteristic; and control said at least one flow regulator, based on the identification, to control a supply of water from the source of water to the identified controllable water outlet.

The processor and memory may be configured for use in an installation that includes both a source of cold water and a source of hot water, and the memory stores instructions which cause the processor to perform the method in respect of both the source of hot water and the source of cold water.

In a fourth aspect there is provided a water supply installation including:

a source of water;

a plurality of controllable water outlets coupled to the source of water;

in a water flow path between the source of water and the plurality of controllable water outlets, a flow measurement device and at least one flow regulator;

and a processor and memory according to the third aspect, the processor being operatively connected to the flow measurement device and the at least one flow regulator.

The water supply installation may include both a source of cold water and a source of hot water, and the memory stores instructions which cause the processor to perform the method in respect of both the source of hot water and the source of cold water The source of water may be a source of water heated by an energy storage arrangement based on a phase change material, the energy storage arrangement being coupled to a heat pump. The phase change material may have a phase transition temperature within the range 40 to 60 Celsius.

In a fifth aspect there is provided a computer program comprising instructions which, when the program is executed by a processor, cause the processor to carry out the method according to the first aspect.

In a sixth aspect there is provided a computer-readable storage medium comprising instructions which, when executed by a processor, cause the processor to carry out the method according to the first aspect.

BRIEF DESCRIPTION OF THE DRAWINGS

Embodiments of various aspects of the disclosure will now be described by way of example only, with reference to the accompanying drawings, in which.

DETAILED DESCRIPTION

Figure 1:
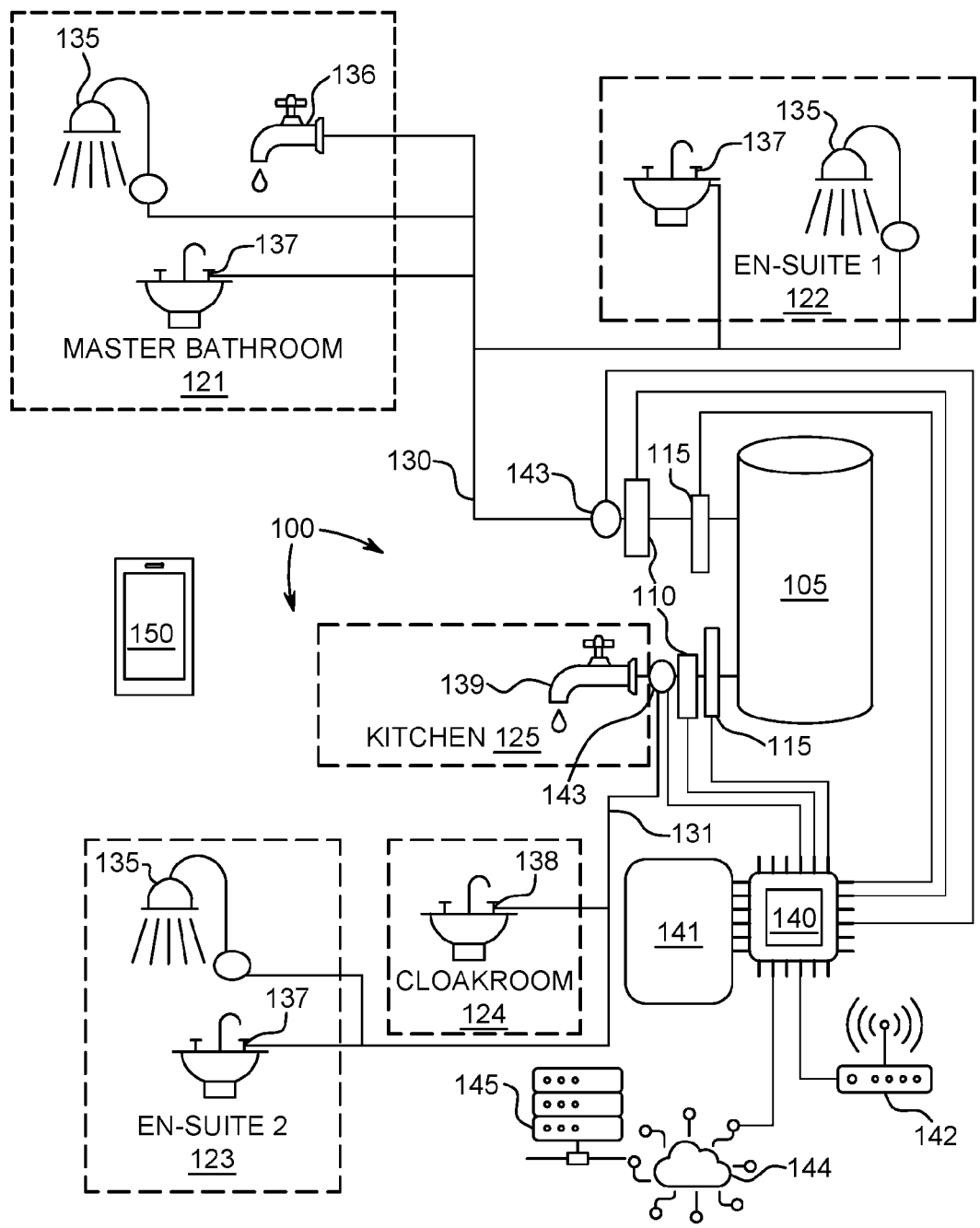
FIG. 1 is a schematic diagram showing an in-building water supply installation according to an aspect of the disclosure.

FIG. 1 shows schematically an in-building water supply installation 100 having a plurality of controllable water outlets (various taps and showers that will be described more fully later), a supply of water 105, and in a water flow path between the supply of water 105 and the plurality of controllable water outlets, at least one flow measurement device 110 and at least one flow regulator 115, and a processor 140 operatively connected to the at least one flow measurement device 110 and the at least one flow regulator 115. The illustrated water supply installation represents a dwelling with a master bathroom 121, a first en-suite shower room 122, a second en-suite shower room 123, a cloakroom 124, and a kitchen 125. The master bathroom and the first en-suite shower room may be on one floor of the dwelling, whereas the cloakroom, second en-suite and kitchen may be on another floor of the dwelling. In such a situation, it may be convenient to have, as shown, two separate circuits, 130 and 131, to supply water to the various outlets.

The master bathroom 121 is shown as including a shower outlet 135, a bath tap or faucet 136, and a tap 137 for a sink. The en-suite shower rooms 122 and 123 also include a shower outlet 135, and a tap 137 for a sink. Conversely, the cloakroom contains just a W.C. (not shown) and a hand basin with a tap 138. Finally, the kitchen has a sink with a tap 139.

A processor, or system controller, 140, with an associated memory 141, is coupled to the at least one flow measurement device 110 and the at least one flow regulator 115. It will be appreciated that each of the two circuits 130 and 131 is provided with a respective flow measurement device 110 and flow regulator 115 The processor is also optionally connected to one or more temperature sensors 143, one for each of the circuits 130 and 131.

The processor is also coupled to an RF transceiver 142, which includes at least one RF transmitter and at least one RF receiver, for bidirectional communication via Wi-Fi, Bluetooth, or the like, and preferably also to the Internet 144 for connection to a server or central station 145, and optionally to a cellular radio network (such as LTE, UMTS, 4G, 5G, etc.). By means of the RF transceiver 142 and/or the connection to the Internet, the processor 140 is able to communicate with a mobile device 150, which may for example be a smart phone or tablet, for use by an installation engineer in mapping the in-building water supply installation. The mobile device 150 includes software, such as a specific app, that co-operates with corresponding software in the system controller 140 and also potentially within server 145, to facilitate the mapping methods according to embodiments of the invention, and in particular to synchronize actions taken by the engineer to a clock of the system controller 140/server 145. The memory 141 contains code to enable the processor to perform a method of mapping an in-building water supply installation processor, for example during a process of commissioning a new installation. For the sake of description, consider FIG. 1 to show a hot water supply installation, although it could equally be a cold water supply installation.

During the commissioning process an engineer will be asked by the processor/system controller 140 to define all hot water outlets (for e.g., tap, shower, bath, kitchen). The system controller will ask the engineer to fully open each of the outlets (taps, shower outlets, etc.) and will monitor the resulting water flow, by means of the relevant flow measurement device 110. During this process, the relevant flow measurement device 110 will measure water flow and the processor will receive these data and will add the results to a database. Based on this information, the system will subsequently be able to provide the most efficient flow into each single tap, by controlling the relevant flow control device 115, when any outlet is opened.

A method of mapping an in-building water supply installation according to a first aspect of the disclosure will now be described with reference to FIG. 1.

The method comprises opening a first of the plurality of controllable water outlets and processing signals from the at least one flow measurement device 110 with the processor 140 at least until a first flow characteristic is determined, and then closing the first of the plurality of controllable water outlets. The opening of the first of the plurality of controllable water outlets is preferably instructed by the processor or system controller 140 sending a message to the mobile device 150 carried by the relevant engineer. For example, the instruction may be sent by Wi-Fi and tell the engineer to open the hot bath tap 136 in the master bathroom 121. The engineer, carrying the mobile device 150, then goes to the master bathroom and opens the hot bath tap 136 fully. The mobile device may provide the engineer with a prompt, preferably audible and with a countdown, to tell the engineer when precisely to open the tap. Alternatively, the app on the mobile device may be configured to accept an input from the engineer, such as the pressing or release of a button, at the moment that the tap 136 is opened. In either case, the app may capture a local time for the prompt or the moment, and then send this local time, along with the identity of the relevant controllable outlet, to the system controller 140 or server 145. In this way, delays in the prompt reaching the mobile device 150 or of the timing of the instruction reaching the controller 140 or server 145 can be accounted for (the mobile device 150 and the system controller 140 preferably go through some handshaking procedure, either before or after the mapping process, so that wither offsets between the clocks of the two devices can be eliminated or they can also be accounted for).

The engineer may then work her way around the premises selecting an outlet identity from a list or menu on the app, or entering an unambiguous identifier, opening each of the outlets in turn. Or the system controller may already have been provided with a list of all the taps, etc. (generally "controllable outlets") and may prompt the engineer, by sending another message to the mobile device 150, to go to the relevant outlet. The app preferably includes the option for the engineer to send a message to the system controller 140/server 145, that she is in place and ready to receive an instruction to open the next controllable outlet. The process is then repeated for each of the other hot water outlets, until all the outlets and their flow characteristics—namely the lag before flow is detected, the rate of rise of flow, the maximum flow rate, and any other identifiable characteristics have been captured and stored in a database. By using the characteristics stored in the database, the processor 140 is then subsequently able to identify the opening of a particular one of the plurality of controllable water outlets based on the similarity of a detected flow characteristic to a respective flow characteristic.

The processor is also provided with some rules concerning preferred flow rates and, optionally, flow durations, based on the type of outlet (bath tap, kitchen tap, basin tap, cloakroom tap) and its location (main bathroom, en-suite, child's room, adult's room, cloakroom, kitchen, for example), and use these rules, along with the outlet identity recognised from the detected flow characteristics, to determine a target flow rate. The targeted flow rate is then imposed by the system controller 140 by controlling the relevant flow controller 115, and preferably monitored by the corresponding flow measurement device 110. In this way, by controlling at least one flow regulator, based on the identification of the relevant outlet, the processor 140 is able control a supply of water to the identified controllable water outlet.

Each of the respective flow characteristic may include a respective stable flow rate. The method may then further comprise configuring the processor 140 to control the at least one flow regulator 115 to impose at least a 10% cut in the flow rate to each of each of the plurality of controllable water outlets, based on the respective stable flow rate. Optionally, the method may further comprise configuring the processor 140 to control the at least one flow regulator 115 to impose at least a 10% cut in the flow rate, based on respective stable flow rate, to any of the plurality of controllable water outlets whose respective stable flow rate is greater than 7 litres per minute. This is of particular application for taps that serve basins in bathrooms, en suites, and most particularly cloakrooms, where taps are often largely used to provide water for handwashing—which can be achieved effectively with quite modest flow rates.

Optionally, an electrically controlled thermostatic mixing valve, not shown, may be coupled between the outlet of the energy bank and the one or more outlets of the hot water supply system, and include a temperature sensor 162 at its outlet. An additional instantaneous water heater, for example an electrical heater (inductive or resistive) controlled by the processor 140, may be positioned in the water flow path between the outlet of the energy bank and the thermostatic mixing valve. A further temperature sensor may be provided to measure the temperature of water output by the additional instantaneous water heater, and the measurements provided to the processor 140. The thermostatic mixing valve would also be coupled to a cold water supply, and be controllable by the processor 140 to mix hot and cold water to achieve a desired supply temperature.

Figure 2:
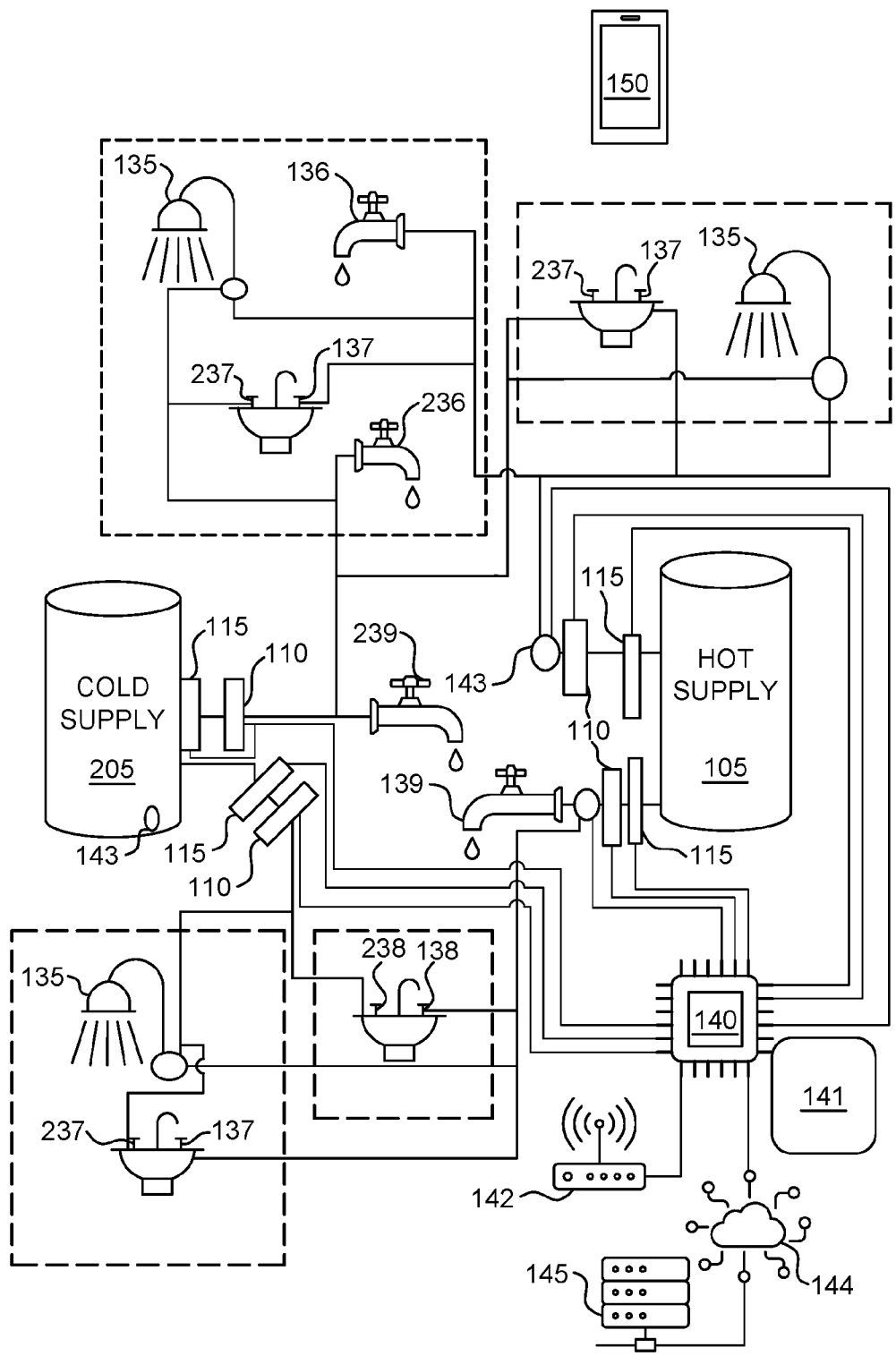
FIG. 2 is a schematic diagram showing an in-building water supply installation, including both a hot water and a cold water supply, according to an aspect of the disclosure.

FIG. 2 corresponds to FIG. 1 but shows schematically an installation including both hot 105 and cold 205 water supplies, with controllable outlets corresponding to those already introduced in FIG. 1. Thus the bath in the master bathroom 121 is provided with a cold water tap 236 along with hot water tap 136, and the basin has both a cold water tap 237 and a hot water tap 137. The shower outlet is also connected to both the hot and cold water supplies. Likewise, in each of the other rooms cold water taps corresponding to the hot water taps are present. These pairs of hot and cold taps may be separate or they may be monoblock, where the two taps are integrated into a whole. Monoblock taps may include separate controls for each of the hot and cold supplies, or they may be mixer taps which have a single control that controls both the amount of hot and cold water and the proportion of the flow that comes from each of the two sources. But in all of these arrangements it is possible to set the tap to give maximum flow of one water type with no water of the other type—i.e. 100% water from the hot supply, or 100% water from the cold supply. In this way it is possible to set any of the taps appropriately for the mapping operation to be described below. This is also generally true of shower mixers too, although they require more care to set to a single source flow.

The cold water outlets can be mapped using the process described with reference to FIG. 1.

It will be recognised that what has just been described is a processor 140 and memory 141 for use in mapping an in-building water supply installation having a source of water 105, a plurality of controllable water outlets 135, 136, 137, coupled to the source of water 105, and at least one flow measurement device 110 and at least one flow regulator 115 in a water flow path 130, 131, between the source of water 105 and the plurality of controllable water outlets 135, 136, 137. The processor 140 is configured for operative connection to the at least one flow measurement device 110 and the at least one flow regulator 115. The memory 141, which is operatively coupled to the processor 140, stores instructions that cause the processor 140 to perform a method of mapping the water supply installation in which method the processor 140 processes signals received from the at least one flow measurement device 110 consequent on the opening of a first of the plurality of controllable water outlets at least until a first flow characteristic is determined. After the closing of the first of the plurality of controllable water outlets, repeating the operations for each of the other controllable water outlets of the plurality to determine for each controllable water outlets a respective flow characteristic. Thereafter, the processor is configured to identify the opening of a particular one of the plurality of controllable water outlets based on the similarity of a detected flow characteristic to a respective flow characteristic, and to control said at least one flow regulator, based on the identification, to control a supply of water from the source of water to the identified controllable water outlet.

The disclosure also provides a computer program comprising instructions which, when the program is executed by a processor 140, cause the processor 140 to carry out the method as just described. The computer program may be loaded into the memory 141 either prior to installation, or may subsequently be downloaded from the server 145 or uploaded from another device, for example using a wired data link or using an RF link of some kind.

The memory 141 may thus constitute a computer-readable storage medium comprising instructions which, when executed by a processor, cause the processor to carry out the method as previously described.

The disclosure also provides a water supply installation including a source of water 105, a plurality of controllable water outlets coupled to the source of water 105, a flow measurement device 110 and at least one flow regulator 115 in a water flow path between the source of water 105 and the plurality of controllable water outlets, together with a processor 140 and memory 141 as just described, the processor 140 being operatively connected to the flow measurement device 110 and the at least one flow regulator 115.

Although in FIGS. 1 and 2 the cold and hot water supplies are, for ease of illustration, both represented simply as containers, it will be appreciated that in practice both water supplies are likely to be fed from some kind of continuous feed, such as a water main. Both supplies may also use some kind of reservoir or accumulator, but this is not essential. Nor, of course, is it essential for either water supply to be connected to any water main—it may be, for example, that one or both water supplies is fed from a storage reservoir.

When mapping the cold water supply, the engineer preferably also includes W.C.s and appliances (such as dishwashers and washing machines, for example) so that the system controller can obtain characteristic signatures also for these outlets. Where appliances are (possibly also) connected to the hot water system, the engineer will also preferably also map those outlets, so that the system controller can capture their characteristic flow signatures. Generally it will not be worthwhile to throttle back water supply to any of these outlets, since they will tend to call just for as much water as they need, and that amount is unlikely to change under the influence of throttling the supply.

The water in the hot water supply may have been heated in a combustion boiler, using oil, gas, or wood, for example, heated by electricity—for example using an immersion heater or an instantaneous electric water heater, or may have been heated using a "green" heat source, such as solar power or a heat pump. As will now be briefly described, in a preferred configuration the hot water supply may include at least two different heat sources, at least one of which is "green".

As was mentioned in the introduction, heat pumps are widely regarded as an important potential contributor to solving the problem of excessive reliance on fossil fuels for, in particular, domestic hot water and space heating. The installations and methods described above address issues of water wastage, and in particular wastage of hot water. This solution can provide yet further benefits, in terms of reducing usage of fossil fuels, if incorporated into an installation in which a heat pump and an energy storage unit are used to provide hot water. Such an arrangement will now be described, by reference to FIG. 3.

Figure 3:
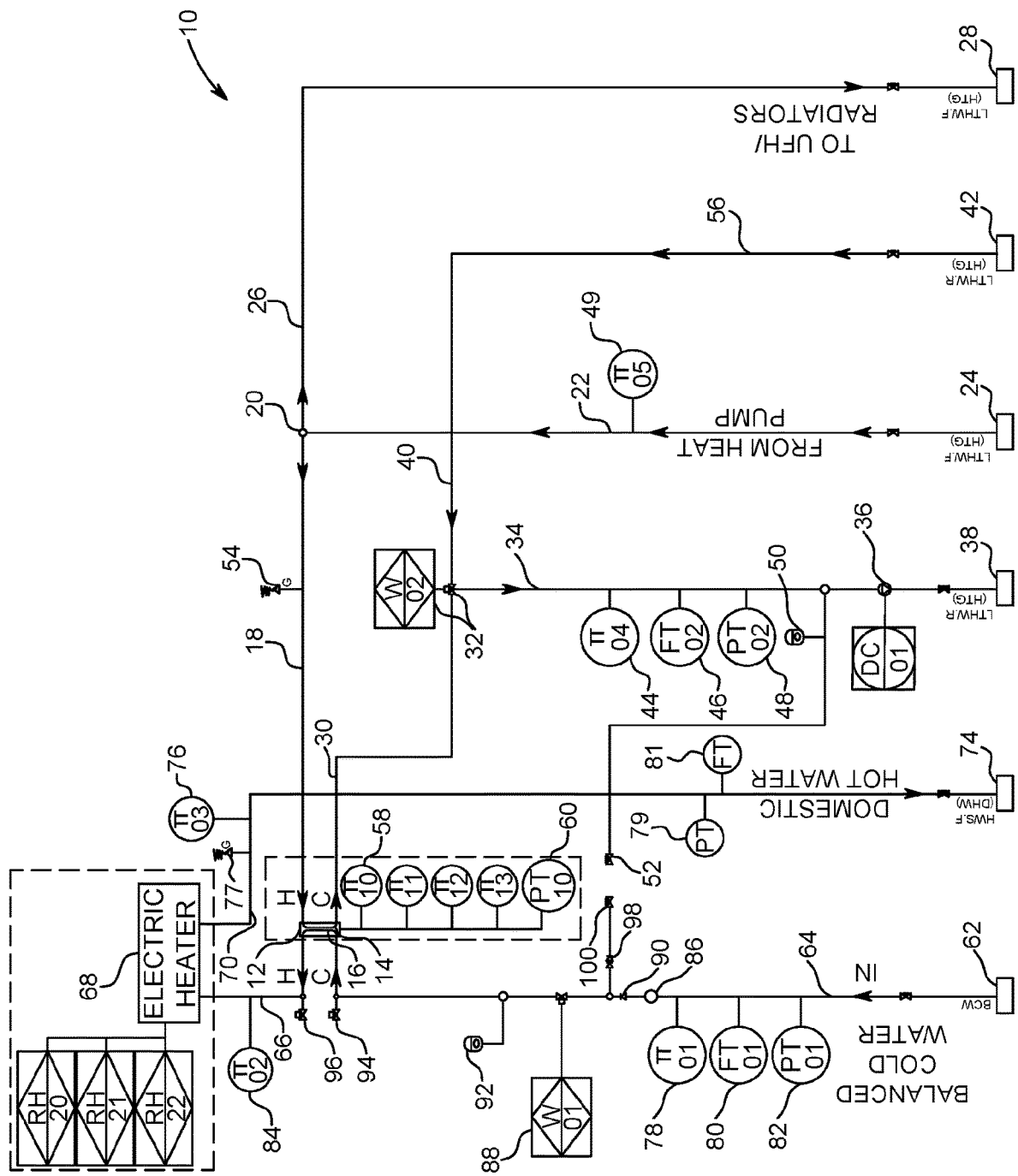
FIG. 3 is a schematic diagram showing a potential arrangement of components of an interface unit by means of which a heat pump can interface to an in-building hot-water supply system according to an aspect of the disclosure.

FIG. 3 shows schematically a potential arrangement of components of an interface unit 250 according to an aspect of the disclosure. The interface unit interfaces between a heat pump (not shown in this Figure) and an in-building hot water system. The interface unit includes a heat exchanger 12 comprising an enclosure (not separately numbered) within which is an input-side circuit, shown in very simplified form as 14, for connection to the heat pump, and an output-side circuit, again shown in very simplified form as 16, for connection to the in-building hot water system (not shown in this Figure). The heat exchanger 12 also contains a thermal storage medium for the storage of energy, but this is not shown in the Figure. In the example that will now be described with reference to FIG. 1 the thermal storage medium is a phase-change material. Throughout this specification, including the claims, references to thermal storage medium, energy storage medium and phase change material should be considered to be interchangeable unless the context clearly requires otherwise.

Typically, the phase-change material in the heat exchanger has an energy storage capacity (in terms of the amount of energy stored by virtue of the latent heat of fusion) of between 2 and 5 MJoules, although more energy storage is possible and can be useful. And of course less energy storage is also possible, but in general one wants to maximise (subject to practical constraints based on physical dimensions, weight, cost and safety) the potential for energy storage in the phase-change material of the interface unit 10. More will be said about suitable phase-change materials and their properties, and also about dimensions etc. later in this specification.

The input side circuit 14 is connected to a pipe or conduit 18 which is in turn fed from node 20, from pipe 22 which has a coupling 24 for connection to a feed from a heat pump. Node 20 also feeds fluid from the heat pump to pipe 26 which terminates in a coupling 28 which is intended for connection to a heating network of a house or flat—for example for plumbing in to underfloor heating or a network of radiators or both. Thus, once the interface unit 10 is fully installed and operational, fluid heated by a heat pump (which is located outside the house or flat) passes through coupling 24 and along pipe 22 to node 20, from where part of the fluid flow passes along pipe 18 to the input-side circuit 14 of the heat exchanger, while the other part of the fluid flow passes along pipe 26 and out through coupling 28 to the heating infrastructure of the house or flat.

Heated fluid from the heat pump flows through the input-side circuit 14 of the heat exchanger and out of the heat exchanger 12 along pipe 30. In use, under some circumstance, heat carried by the heated fluid from the heat pump gives up some of its energy to the phase change material inside the heat exchanger and some to water in the output-side circuit 16. Under other circumstances, as will be explained later, fluid flowing through the input-side circuit 14 of the heat exchanger actually acquires heat from the phase change material.

Pipe 30 feeds fluid that leaves the input-side circuit 14 to a motorized 3-port valve 32 and then, depending upon the status of the valve out along pipe 34 to pump 36. Pump 36 serves to push the flow on to the external heat pump via coupling 38.

The motorized 3-port valve 32 also receives fluid from pipe 40 which receives, via coupling 42, fluid returning from the heating infrastructure (e.g. radiators) of the house or flat.

Between the motorized 3-port valve 32 and the pump 36 a trio of transducers are provided: a temperature transducer 44, a flow transducer 46, and a pressure transducer 48. In addition, a temperature transducer 49 is provided in the pipe 22 which brings in fluid from the output of the heat pump. These transducers, like all the others in the interface unit 10, are operatively connected to or addressable by a processor, not shown, which is typically provided as part of the interface unit—but which can be provided in a separate module.

Although not illustrated in FIG. 3, an additional electrical heating element may also be provided in the flow path between the coupler 24, which receives fluid from the output of the heat pump. This additional electrical heating element may again be an inductive or resistive heating element and is provided as a means to compensate for potential failure of the heat pump, but also for possible use in adding energy to the thermal storage unit (for example based on the current energy cost and predicted for heating and/or hot water. The additional electrical heating element is also of course controllable by the processor of the system.

Also coupled to pipe 34 is an expansion vessel 50, to which is connected a valve 52 by means of which a filling loop may be connected to top up fluid in the heating circuit. Also shown as part of the heating circuit of the interface unit are a pressure relief valve 54, intermediate the node 20 and the input-side circuit 14, and a strainer 56 (to capture particulate contaminants) intermediate coupling 42 and the 3-port valve 32.

The heat exchanger 12 is also provided with several transducers, including at least one temperature transducer 58, although more (e.g. up to 4 or more) are preferable provided, as shown, and a pressure transducer 60. In the example shown, the heat exchanger includes 4 temperature transducers uniformly distributed within the phase change material so that temperature variations can be determined (and hence knowledge obtained about the state of the phase change material throughout its bulk). Such an arrangement may be of particular benefit during the design/implementation phase as a means to optimise design of the heat exchanger—including in optimising addition heat transfer arrangements. But such an arrangement may also continue to be of benefit in deployed systems as having multiple sensors can provide useful information to the processor and machine learning algorithms employed by the processor (either of just the interface unit, and/or of a processor of a system including the interface unit.

The arrangement of the cold water feed and the hot water circuit of the interface unit 10 will now be described. A coupling 62 is provided for connection to a cold feed from a water main. Typically, before water from the water main reaches the interface unit 10, the water will have passed through an anti-syphon non-return valve and may have had its pressure reduced. From coupling 62 cold water passes along pipe to the output-side circuit 16 of the heat exchanger 12. Given that we provide a processor that is monitoring numerous sensors in the interface unit, the same processor can optionally be given one more task to do. That is to monitor the pressure at which cold water is delivered from the mains water supply. To this end, a further pressure sensor can be introduced in to the cold water supply line upstream of coupling 62, and in particular upstream of any pressure reducing arrangement within the premises. The processor can then continually or periodically monitor the supplied water pressure, and even prompt the owner/user to seek compensation from the water supply company if the water main supplies water at a pressure below the statutory minimum.

From the output-side circuit 16 water, which may have been heated by its passage through the heat exchanger, passes along a pipe 66 to an electrical heating unit 68. The electrical heating unit 68, which is under the control of the processor mentioned previously, may comprise a resistive or inductive heating arrangement whose heat output can be modulated in accordance with instructions from the processor.

The processor is configured to control the electrical heater, based on information about the status of the phase-change material and of the heat pump.

Typically, the electrical heating unit 68 has a power rating of no more than 10 kW, although under some circumstances a more powerful heater, e.g. 12 kW, may be provided.

From the electric heater 68, what will by now hot water passes along a pipe 70 to a coupling 74 to which the hot water circuit, including controllable outlets such as taps and showers, of the house or flat will be connected.

A temperature transducer 76 is provided after the electric heater 68, for example at the outlet of the electric heater 68 to provide information on the water temperature at the outlet of the hot water system. A pressure relief valve 77 is also provided in the hot water supply, and while this is shown as being located between the electric heater 68 and the outlet temperature transducer 76, its precise location is unimportant—as indeed is the case for many of the components illustrated in FIG. 3.

Also somewhere in the hot water supply line is a pressure transducer 79 and or a flow transducer 81 either of which can be used by the processor to detect a call for hot water—i.e. detect the opening of a controllable outlet such as a tap or shower. The flow transducer is preferably one which is free from moving parts, for example based on sonic flow detection or magnetic flow detection. The processor can then use information from one or both of these transducers, along with its stored logic, to decide whether to signal to the heat pump to start.

It will be appreciated that the processor can call on the heat pump to start either based on demand for space heating (e.g. based on a stored program either in the processor or in an external controller, and/or based on signals from one or more thermostats—e.g. room stats, external stats, underfloor heating stats) or demand for hot water. Control of the heat pump may be in the form of simple on/off commands, but may also or alternatively be in the form of modulation (using, for example, a ModBus).

As is the case with the heating circuit of the interface unit, a trio of transducers are provided along the cold water feed pipe 64: a temperature transducer 78, a flow transducer 80, and a pressure transducer 82. Another temperature transducer 84 is also provided in pipe 66 intermediate the outlet of the output-side circuit 16 of the heat exchanger 12 and the electric heater 68. These transducers are again all operatively connected to or addressable by the processor mentioned previously.

Also shown on the cold water supply line 64 are a magnetic or electrical water conditioner 86, a motorised and modulatable valve 88 (which like all the motorised valves may be controlled by the processor mentioned previously), a non-return valve 90, and an expansion vessel 92. The modulatable valve 88 can be controlled to regulate the flow of cold water to maintain a desired temperature of hot water (measured for example by temperature transducer 76).

Valves 94 and 96 are also provided for connection to external storage tanks for the storage of cold and heated water respectively. Finally, a double check valve 98 connects cold feed pipe 64 to another valve 100 which can be used with a filling loop to connect to previously mentioned valve 52 for charging the heating circuit with more water or a mix of water and corrosion inhibiter.

It should be noted that FIG. 3 shows various of the pipes crossing, but unless these crossing are shown as nodes, like node 20, the two pipes that are shown as cross do not communicate with each other, as should by now be clear from the foregoing description of the Figure.

Although not shown in FIG. 3, the heat exchanger 12 may include one or more additional electrical heating elements configured to put heat into the thermal storage medium. While this may seem counter intuitive, it permits the use of electrical energy to pre-charge the thermal storage medium at times when it makes economic sense to do so, as will now be explained.

It has long been the practice of energy supply companies to have tariffs where the cost of a unit of electricity varies according to the time of day, to take account of times of increased or reduced demand and to help shape customer behaviour to better balance demand to supply capacity. Historically, tariff plans were rather coarse reflecting the technology both of power generation and of consumption. But increasing incorporation of renewable energy sources of electrical power—such as solar power (e.g. from photovoltaic cells, panels, and farms) and wind power, into the power generation fabric of countries has spurred the development of a more dynamic pricing of energy. This approach reflects the variability inherent in such weather-dependent power generation. Initially such dynamic pricing was largely restricted to large scale users, increasingly dynamic pricing is being offered to domestic consumers.

The degree of dynamism of the pricing varies from country to country, and also between different producers within a given country. At one extreme, "dynamic" pricing is little more than the offering of different tariffs in different time windows over the day, and such tariffs may apply for weeks, months, or seasons without variation. But some dynamic pricing regimes enable the supplier to change prices with a day's notice or less—so for example, customers may be offered today prices for half-hour slots tomorrow. Time slots of as short as 6 minutes are offered in some countries, and conceivably the lead time for notifying consumers of forthcoming tariffs can be reduced further by including "intelligence" in energy-consuming equipment.

Because it is possible to use short and medium term weather predictions to predict both the amount of energy likely to be produced by solar and wind installations, and the likely scale of power demand for heating and cooling, it becomes possible to predict periods of extremes of demand. Some power generation companies with significant renewable generation capacity have even been known to offer negative charging for electricity—literally paying customers to use the excess power. More often, power may be offered at a small fraction of the usual rate.

By incorporating an electric heater into an energy storage unit, such as a heat exchanger of systems according to the disclosure, it becomes possible for consumers to take advantage of periods of low cost supply and to reduce their reliance on electrical power at times of high energy prices. This not only benefits the individual consumer, but it is also beneficial more generally as it can reduce demand at times when excess demand must be met by burning fossil fuels.

The processor of the interface unit has a wired or wireless connection (or both) to a data network, such as the Internet, to enable the processor to receive dynamic pricing information from energy suppliers. The processor also preferably has a data link connection (e.g. a ModBus) to the heat pump, both to send instructions to the heat pump and to receive information (e.g. status information and temperature information) from the heat pump. The processor has logic which enables it\* to learn the behaviour of the household, and with this and the dynamic pricing information, the processor is able to determine whether and when to use cheaper electricity to pre-charge the heating system. This may be by heating the energy storage medium using an electrical element inside the heat exchanger, but alternatively this can be by driving the heat pump to a higher than normal temperature—for example 60 Celsius rather than between 40 and 48 Celsius. The efficiency of the heat pump reduce when it operates at higher temperature, but this can be taken into account by the processor in deciding when and how best to use cheaper electricity.

\*Because the system processor is connectable to a data network, such as the Internet and/or a provider's intranet, the local system processor can benefit from external computing power. So, for example the manufacturer of the interface unit is likely to have a cloud presence (or intranet) where computing power is provided for calculations of, for example, predicted: occupancy; activity; tariff (short/long); weather forecasts (which may be preferable to generally available weather forecasts because they can be pre-processed for easy use by the local processor, and they may also be tailored very specifically to the situation, location, exposure of the property within which the interface unit is installed);

identification of false positives and/or false negatives.

To protect users from the risk of scalding by overheated water from the hot water supply system it is sensible to provide a scalding protection feature. This may take the form of providing an electrically controllable (modulatable) valve to mix cold water from the cold water supply into hot water as it leaves the output circuit of the heat exchanger (the extra valve can be mounted between the nodes to which existing valves 94 and 96 previously mentioned).

As one aspect of the disclosure, we propose to replace the combi gas boiler by the premanufactured set of heat exchangers, PCM energy bank, valves, pumps, and other hardware with the controller—all of them in the box which may match the shape and form of a gas combi boiler. Such an approach may lead to a significant decrease in the installation time and complexity of the plumbing work either to replace an existing gas combi boiler or for a new installation in place of a gas combi boiler.

FIG. 3 shows schematically what might be considered the "guts" of the interface unit, but does not show any container for these "guts". An important application of interface units according to the disclosure is as a means to enable a heat pump to be used as a practical contributor to the space heating and hot water requirements of a dwelling that was previously provide with a gas-fired combination boiler (or which might otherwise have such a boiler installed), it will be appreciated that it will often be convenient both to provide a container both for aesthetics and safety, just as is the case conventionally with combi boilers. Moreover, preferably any such container will be dimensioned to fit within a form factor enabling direct replacement of a combi boiler—which are typically wall mounted, often in a kitchen where they co-exist with kitchen cabinets. Based on the form of a generally rectangular cuboid (although of course, for aesthetics, ergonomics, or safety, curved surfaces may be used for any or all of the surfaces of the container) with a height, width and depth, suitable sizes may be found in the approximate ranges: height 650 mm to 800 mm; width 350 mm to 550 mm; depth 260 mm to 420 mm; for example 800 mm high, by 500 mm wide, and 400 mm deep, although larger, and in particular taller, units may be provided for use in situations that can accommodate such larger units.

One notable distinction of interface units according to the disclosure with respect to gas combi boilers is that while the containers of the latter generally have to be made of non-combustible materials—such as steel, due to the presence of a hot combustion chamber, the internal temperatures of an interface unit will generally be considerably less than 100 Celsius, typically less than 70 Celsius, and often less than 60 Celsius. So it becomes practical to use flammable materials such a wood, bamboo, or even paper, in fabricating a container for the interface unit.

The lack of combustion also opens up the possibility to install interface units in locations that would generally never be considered as suitable for the installation of gas combi boilers—and of course, unlike a gas combi boiler, interface units according to the disclosure, do not require a flue for exhaust gases. So, for example, it becomes possible to configure an interface unit for installation beneath a kitchen worktop, and even to make use of the notorious dead spot represented by an under counter corner. For installation in such a location the interface unit could actually be integrated into an under counter cupboard—preferably through a collaboration with a manufacturer of kitchen cabinets. But greatest flexibility for deployment would be retained by having an interface unit that effectively sits behind some form of cabinet, the cabinet being configured to allow access to the interface unit. The interface unit would then preferably be configured to permit the circulation pump 36 to be slid out and away from the heat exchanger 12 before the circulation pump 36 is decoupled from the flow path of the input-side circuit.

Consideration can also be given to taking advantage of other space frequently wasted in fitted kitchens, namely the space beneath under-counter cupboards. There is often more a space with a height of more than 150 mm, and a depth of around 600 mm, with widths of 300, 400, 500, 600 mm or more (although allowance needs to be made for any legs supporting the cabinets). For new installations in particular, or where a combi boiler is being replaced along with a kitchen refit, it makes sense to use these spaces at least to accommodate the heat exchanger of the interface unit—or to use more than one heat exchanger unit for a given interface unit.

Particularly for interface units designed for wall mounting, although potentially beneficial whatever the application of the interface unit, it will often be desirable to design the interface unit as a plurality of modules. With such designs it can be convenient to have the heat exchanger as one of the of modules, because the presence of the phase-change material can result in the heat exchanger alone weighing more than 25 kg. For reasons of health and safety, and in order to facilitate one-person installation, it would be desirable to ensure that an interface unit can be delivered as a set of modules none of which weighs more than about 25 kg.

Such a weight constraint can be supported by making one of the modules a chassis for mounting the interface unit to a structure. For example, where an interface unit is to be wall mounted in place of an existing gas combi boiler, it can be convenient if a chassis, by which the other modules are supported, can first be fixed to the wall. Preferably the chassis is designed to work with the positions of existing fixing points used to support the combi boiler that is being replaced. This could potentially be done by providing a "universal" chassis that has fixing holes preformed according to the spacings and positions of popular gas combi boilers. Alternatively, it could be cost effective to produce a range of chassis each having hole positions/sizes/spacings to match those of particular manufacturer's boilers. Then one just needs to specify the right chassis to replace the relevant manufacturer's boiler. There are multiple benefits to this approach: it avoids the need to drill more holes for plugs to take fixing bolts—and not only does this eliminate the time needed to mark out, drill the holes and clean up, but it avoids the need to further weaken the structure of the dwelling where installation is taking place—which can be an important consideration given the low cost construction techniques and materials frequently used in "starter homes" and other low cost housing.

It will be appreciated that the energy storage unit stores energy as latent heat, but can also store heat in the form of sensible heat, as is the case when the phase change material is heated to above the phase change temperature, for example if the PCM is a paraffin wax, the PCM can be heated to the phase change temperature, at which it will eventually melt, and then further heat input will take the temperature of the wax above the melting point. But in any event, during use of the energy storage unit it will be at a temperature of the water in the hot water system—so in the region of around 40 to 60 Celsius. As such, in order to avoid wasting energy, it is sensible to provide the energy storage unit with thermal insulation. The choice of insulation depends upon the environment, and in particular on the temperature gradient across the insulation, the available space, and also on cost.

Preferably the heat exchanger module and the chassis module are configured to couple together. In this way it may be possible to avoid the need for separable fastenings, again saving installation time.

Preferably an additional module includes first interconnects, e.g. 62 and 74, to couple the output side circuit 16 of the heat exchanger 12 to the in-building hot water system. Preferably the additional module also includes second interconnects, e.g. 38 and 24, to couple the input side circuit 14 of the heat exchanger 12 to the heat pump. Preferably the additional module also includes third interconnects, e.g. 42 and 28, to couple the interface unit to the heat circuit of the premises where the interface unit is to be used. It will be appreciated that by mounting heat exchanger to the chassis which is itself directly connected to the wall, rather than first mounting the connections to the chassis, the weight of the heat exchanger is kept closer to the wall, reducing the cantilever loading effect on the wall fixings that secure the interface unit to the wall.

Phase Change Materials

One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 Celsius, and within this range waxes can be found that melt at different temperatures to suit specific applications. Typical latent heat capacity is between about 180 KJ/kg and 230 KJ/kg and a specific heat of perhaps 2.27 $Jg^{-1}K^{-1}$ in the liquid phase, and 2.1 $Jg^{-1}K^{-1}$ in the solid phase. It can be seen that very considerable amounts of energy can be stored taking using the latent heat of fusion. More energy can also be stored by heating the phase change liquid above its melting point. For example, when electricity costs are relatively low and it can be predicted that there will shortly be a need for hot water (at a time when electricity is likely to, or known to be going to, cost more perhaps), then it can make sense to run the heat pump at a higher than normal temperature to "overheat" the thermal energy store.

A suitable choice of wax may be one with a melting point at around 48 Celsius, such as n-tricosane $C_{23}$, or paraffin $C_{20}$-$C_{33}$. Applying the standard 3 K temperature difference across the heat exchanger (between the liquid supplied by the heat pump and the phase change material in the heat exchanger) gives a heat pump liquid temperature of around 51 Celsius. And similarly on the output side, allowing a 3 K temperature drop, we arrive at a water temperature of 45 Celsius which is satisfactory for general domestic hot water—hot enough for kitchen taps, but potentially a little high for shower/bathroom taps—but obviously cold water can always be added to a flow to reduce water temperature. Of course, if the household are trained to accept lower hot water temperatures, or if they are acceptable for some other reason, then potentially a phase change material with a lower melting point may be considered, but generally a phase transition temperature in the range 45 to 50 is likely to be a good choice. Obviously we will want to take into account the risk of Legionella from storing water at such a temperature.

Heat pumps (for example ground source or air source heat pumps) have operating temperatures of up to 60 Celsius (although by using propane as a refrigerant, operating temperatures of up to 72 Celsius are possible), but their efficiencies tend to be much higher when run at temperatures in the range of 45 to 50 Celsius. So our 51 Celsius, from a phase transition temperature of 48 Celsius is likely to be satisfactory.

Consideration also needs to be given to the temperature performance of the heat pump. Generally, the maximum ΔT (the difference between the input and output temperature of the fluid heated by the heat pump) is preferably kept in the range of 5 to 7 Celsius, although it can be as high as 10 Celsius.

Although paraffin waxes are a preferred material for use as the energy storage medium, they are not the only suitable materials. Salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3 \cdot 5H_2O$, which has a melting point around 48 to 49 Celsius, and latent heat of 200/220 KJ/kg.

In terms simply of energy storage, consideration can also be given to using PCMs with phase transition temperatures that are significantly above the 40-50 Celsius range. For example, a paraffin wax, waxes being available with a wide range of melting points:

n-henicosane $C_{24}$ which has a melting point around 40 Celsius;

n-docosane $C_{21}$ which has a melting point around 44.5 Celsius;

n-tetracosane $C_{23}$ which has a melting point around 52 Celsius;

n-pentacosane $C_{25}$ which has a melting point around 54 Celsius;

n-hexacosane $C_{26}$ which has a melting point around 56.5 Celsius;

n-heptacosane $C_{27}$ which has a melting point around 59 Celsius;

n-octacosane $C_{28}$ which has a melting point around 64.5 Celsius;

n-nonacosane $C_{29}$ which has a melting point around 65 Celsius;

n-triacosane $C_{30}$ which has a melting point around 66 Celsius;

n-hentriacosane $C_{31}$ which has a melting point around 67 Celsius;

n-dotriacosane $C_{32}$ which has a melting point around 69 Celsius;

n-triatriacosane $C_{33}$ which has a melting point around 71 Celsius;

paraffin $C_{22}$-$C_{45}$ which has a melting point around 58 to 60 Celsius;

paraffin $C_{21}$-$C_{50}$ which has a melting point around 66 to 68 Celsius;

RT 70 HC which has a melting point around 69 to 71 Celsius.

Alternatively, a salt hydrate such as $CH_3COONa \cdot 3H_2O$—which has a melting point around 58 Celsius, and latent heat of 226/265 KJ/kg.

It will be appreciated that the significance of the described methods and systems of reducing usage of hot water is increased when used in combination with heat pumps, because one of the key issues with heat pumps is their relatively limited ability to satisfy demand for hot water—at least when compared to instantaneous gas and electric water heaters, such as combi boilers, compared to their strengths as sources of heat for space heating. As noted earlier, for the typically modestly sized dwellings of the UK, space heating demands are commonly as low as 6 kW, whereas gas combi boilers even in modest one or two bed flats can typically provide 20 kW to 30 kW for instant water heating. The 6 kW space heating demand is readily achievable in Europe with even an air source heat pump, but a unit that could provide 20 to 30 kW would be unacceptably large and expensive. By reducing demand for hot water, the methods and arrangements according to the first through sixth aspects of the invention makes the use of a heat pump as a primary energy source more attractive, especially when coupled with a PCM-based energy store which can also be charged using the heat pump. The described combination of a heat pump, PCM energy bank, and top up instantaneous water heater, is particularly advantageous in combination with the first through sixth aspects of the invention.

The processor of the interface unit is configured to control the heat pump, the energy bank, and the instantaneous water heater. In order to be able to do this, the processor is provided with information on the status of the energy bank, the status of the heat pump, and preferably information about the water flow rate. The information about water flow rate may be provided by a flow measurement device in the relevant flow path, but may also be based on a recognition of the outlet that has been opened—as will be described later. With knowledge of the relevant outlet or relevant outlet type, a prediction may be made of the likely duration of the demand for water. For example, if the outlet that has been opened is associated with a hand basin in a cloakroom, it can be expected that the outlet will be closed again within no more than about 60 seconds—because it is highly likely that the demand for hot water is because someone wants to wash their hands. Conversely, if the outlet that has been opened is that serving a bath, it can confidently be predicted that the demand for water will continue for more than five minutes.

The processor can also be provided with logic to improve management of the various heating resources, based on time of day, day of the week, season, and stored all learned behaviour of the household. For example, a family with school-age children can reliably be predicted to have the same pattern of hot water demands between say 7 AM and 8:30 AM from Monday to Friday during school terms, but to have a very different pattern of behaviour, typically rather later in the morning, at weekends, and during school holidays.

In order to provide the processor with information on the status of the energy bank, the energy bank is provided with one or more sensors to provide status information, for example based on optical or sonic analysis of the phase change material, or on an internal pressure within the energy bank, and or a displacement measurement based on an expansion or contraction of the enclosure of the energy bank. The processor is in bidirectional communication with the heat pump, and is arranged to receive status information from the heat pump. The processor is also aware of its history of demands on the heat pump. Conventionally heat pumps are configured to start no more than typically six times per hour, and their internal processors carry out checks and monitor the status of the compressor, pumps, etc., and these data are used by the internal processor of the heat pump in deciding whether or not to comply with a start request. Typically, if the processor of the heat pump cannot comply with a start request, it will inform the requester (in this case the processor of the interface unit) that it cannot comply with the request to start.

As already mentioned, a hot water installation including an interface unit as previously described may optionally include an instantaneous water heater, for example an electric heater in the flow path downstream of, or in parallel with the energy bank. The instantaneous water heater should also be under the control of the processor of interface unit. The processor of the interface unit is preferably configured to manage the instantaneous water heater, the PCM energy bank, and the heat pump to satisfy demands for hot water economically. The processor of the interface unit is preferably connected to the Internet, at least intermittently, and is in this, or some other, way made aware of tariff information for the electrical supply to which the heat pump, interface unit, and electrical instantaneous heater are connected. In this way, the processor is able to take advantage of low electrical tariffs as and when they arise. For example, if the processor of the interface unit becomes aware that electricity is cheap or is going to become cheap at the time of predicted or known demand, or shortly before such predicted or known demand, then the processor can instruct the heat pump to operate to put energy into the energy bank, so that the energy in the energy bank can be used when the demand arises. Also, if hot water is demanded while a low electricity tariff is available, it may be more cost-effective to use the instantaneous electric water heater for brief hot water supply than to use the heat pump.

The processor of the interface unit may also control one or more flow regulators in the hot water supply as part of its management process, along with controlling the various energy sources.

It will be appreciated that the combination of an interface unit as described, along with a heat pump, and the arrangements for mapping and subsequently controlling the hot water supply system provides clear advantages in terms of helping to reduce fossil fuel usage for domestic hot water consumption, and also to reduce water usage.

Thus far, the thermal energy store has largely been described as having a single mass of phase change material within a heat exchanger that has input and output circuits each in the form of one or more coils or loops. But it may also be beneficial in terms of rate of heat transfer for example, to encapsulate the phase change material in a plurality of sealed bodies—for example in metal (e.g. copper or copper alloy) cylinders (or other elongate forms)—which are surrounded by a heat transfer liquid from which the output circuit (which is preferably used to provide hot water for a (domestic) hot water system) extracts heat.

With such a configuration the heat transfer liquid may either be sealed in the heat exchanger or, more preferably, the heat transfer liquid may flow through the energy store and may be the heat transfer liquid that transfers heat from the green energy source (e.g. a heat pump) without the use of an input heat transfer coil in the energy store. In this way, the input circuit may be provided simply by one (or more generally multiple) inlets and one or more outlets, so that heat transfer liquid passes freely through the heat exchanger, without being confined by a coil or other regular conduit, the heat transfer liquid transferring heat to or from the encapsulated PCM and then on to the output circuit (and thus to water in the output circuit). In this way, the input circuit is defined by the one or more inlets and the one or more out for the heat transfer liquid, and the freeform path(s) past the encapsulated PCM and through the energy store.

Preferably the PCM is encapsulated in multiple elongate closed-ended pipes arranged in one or more spaced arrangements (such as staggered rows of pipes, each row comprising a plurality of spaced apart pipes) with the heat transfer fluid preferably arranged to flow laterally (or transverse to the length of the pipe or other encapsulating enclosure) over the pipes—either on route from the inlets to the outlets or, if an input coil is used, as directed by one or more impellers provided within the thermal energy store.

Optionally, the output circuit may be arranged to be at the top of the energy store and positioned over and above the encapsulated PCM—the containers of which may be disposed horizontally and either above an input loop or coil (so that convection supports energy transfer upwards through the energy store) or with inlets direction incoming heat transfer liquid against the encapsulated PCM and optionally towards the output circuit above. If one or more impellers is used, preferably the or each impeller is magnetically coupled to an externally mounted motor—so that the integrity of the enclosure of the energy store is not compromised.

Optionally the PCM may be encapsulated in elongate tubes, typically of circular cross section, with nominal external diameters in the range of 20 to 67 mm, for example 22 mm, 28 mm, 35 mm, 42 mm, 54 mm, or 67 mm, and typically these tubes will be formed of a copper suitable for plumbing use. Preferably, the pipes are between 22 mm and 54 mm, for example between 28 mm and 42 mm external diameter.

The heat transfer liquid is preferably water or a water-based liquid such as water mixed with one or more of a flow additive, a corrosion inhibitor, an anti-freeze, a biocide,—and may for example comprise an inhibitor of the type designed for use in central heating systems—such as Sentinel X100 or Fernox F1 (both RTM)—suitably diluted in water.

Thus, throughout the description and claims of the present application the expression input circuit should be construed, unless the context clearly requires otherwise, to include an arrangement as just described and in which the path of liquid flow from the input of the input circuit to its output is not defined by a regular conduit but rather involves the liquid flowing substantially freely within the enclosure of the energy store.

The PCM may be encapsulated in a plurality of elongate cylinders of circular or generally circular cross section, the cylinders preferably being arranged spaced apart in one or more rows. Preferably the cylinders in adjacent rows are offset with respect to each other to facilitate heat transfer from and to the heat transfer liquid. Optionally an input arrangement is provided in which heat transfer liquid is introduced to the space about the encapsulating bodies by one or more input ports which may be in the form of a plurality of input nozzles, that direct the input heat transfer liquid towards and onto the encapsulating bodies fed by an input manifold. The bores of the nozzles at their outputs may be generally circular in section or may be elongate to produce a jet or stream of liquid that more effectively transfers heat to the encapsulated PCM. The manifold may be fed from a single end or from opposed ends with a view to increasing the flow rate and reducing pressure loss.

The heat transfer liquid may be pumped into the energy store 12 as the result of action of a pump of the green energy source (e.g. a heat pump or solar hot water system), or of another system pump, or the thermal energy store may include its own pump. After emerging from the energy store at one or more outlets of the input circuit the heat transfer liquid may pass directly back to the energy source (e.g. the heat pump) or may be switchable, through the use of one or more valves, to pass first to a heating installation (e.g. underfloor heating, radiators, or some other form of space heating) before returning to the green energy source.

The encapsulating bodies may be disposed horizontally with the coil of the output circuit positioned above and over the encapsulating bodies. It will be appreciated that this is merely one of many possible arrangements and orientations. The same arrangement could equally well be positioned with the encapsulating bodies arranged vertically.

Alternatively, an energy store using PCM encapsulation may again use cylindrical elongate encapsulation bodies such as those previously described, but in this case with an input circuit in the form of conduit for example in the form of a coil. The encapsulation bodies may be arranged with their long axes disposed vertically, and the input 14 and output 18 coils disposed to either side of the energy store 12. But again, this arrangement could also be used in an alternative orientation, such as with the input circuit at the bottom and the output circuit at the top, and the encapsulation bodies with their long axes disposed horizontally. Preferably one or more impellers are arranged within the energy store 12 to propel energy transfer liquid from around the input coil 14 towards the encapsulation bodies. The or each impeller is preferably coupled via a magnetic drive system to an externally mounted drive unit (for example an electric motor) so that the enclosure of the energy store 12 does not need to be perforated to accept a drive shaft—thereby reducing the risk of leaks where such shafts enter the enclosure.

By virtue of the fact that the PCM is encapsulated it becomes readily possible to construct an energy store that uses more than one phase change material for energy storage, and in particular permits the creation of an energy storage unit in which PCMs with different transition (e.g. melting) temperatures can be combined thereby extending the operating temperature of the energy store.

It will be appreciated that in embodiments of the type just described the energy store 12 contains one or more phase change materials to store energy as latent heat in combination with a heat transfer liquid (such as water or a water/inhibitor solution).

A plurality of resilient bodies that are configured to reduce in volume in response to an increase in pressure caused by a phase change of the phase change material and to expand again in response to a reduction in pressure caused by a reverse phase change of the phase change material are preferably provided with the phase change material within the encapsulation bodies (they may also be used in energy banks using "bulk" PCMs as described elsewhere in this specification.

The present application contains a number of self-evidently inter-related aspects and embodiments, generally based around a common set of problems, even if many aspects do have broader applicability. In particular the logic and control methods, whilst not necessarily limited to operating with the hardware disclosed and may be more broadly applied, are all particularly suited to working with the hardware of the various hardware aspects and the preferred variants thereof. It will be appreciated by the skilled person that certain aspects relate to specific instances of other features and the preferred features described or claimed in particular aspects may be applied to others. The disclosure would become unmanageably long if explicit mention were made at every point of the inter-operability and the skilled person is expected to appreciate, and is hereby explicitly instructed to appreciate, that preferred features of any aspect may be applied to any other unless otherwise explicitly stated otherwise or manifestly inappropriate from the context. Again for the sake of avoiding repetition, many aspects and concepts may be described only in method form or in hardware form but the corresponding apparatus or computer program or logic is also to be taken as disclosed in the case of a method or the method of operating the hardware in the case of an apparatus discussion. For an example of what is meant by the above, there are a number of features of both hardware and software relating to the combination of a fluid based (typically air source) heat pump and a phase change material and an electric supplementary heating element and control by a processor (within the unit or remote or both). Although this is the preferred application, most methods and hardware are more generally applicable to other heat pumps (thermoelectric and ground source) and to other renewable energy sources (a pump for a solar array for example) and to alternative supplementary heating (including the less preferred arrangement of a combustion heater such as a gas boiler, or even a less efficient higher temperature lower COP heat pump) and alternative thermal storage, including multi-temperature thermal storage arrays. Moreover aspects which give particular arrangements for any of the components or their interaction can be used freely with aspects which focus on alternative elements of the system.

The invention claimed is:

1. A method of mapping an in-building water supply installation, the installation including:
   a supply of water;

a plurality of controllable water outlets coupled to the supply of water;
in a water flow path between the supply of water and the plurality of controllable water outlets, at least one flow measurement device and at least one flow regulator;
a processor operatively connected to the at least one flow measurement devices and the at least one flow regulator; the method comprising:
opening a first of the plurality of controllable water outlets and processing signals from the at least one flow measurement device with the processor at least until a first flow characteristic is determined;
closing the first of the plurality of controllable water outlets;
repeating the opening, processing and closing operations for each of the other controllable water outlets of the plurality to determine for each controllable water outlet a respective flow characteristic;
subsequently configuring the processor to:
identify the opening of a particular one of the plurality of controllable water outlets based on the similarity of a detected flow characteristic to a respective flow characteristic; and
control said at least one flow regulator, based on the identification, to control a supply of water to the identified controllable water outlet.

2. The method of claim 1, wherein the processor is coupled to a radio frequency transmitter, the method further comprising the processor sending a series of signals to the radio frequency transmitter, each of the signals causing the radio frequency transmitter to transmit a signal instructing the opening of a different one of the plurality of controllable water outlets.

3. The method of claim 1, wherein the processor is coupled to a radio frequency receiver, the method further comprising receiving at the processor a series of signal from the radio frequency receiver, each of the received signals corresponding to the opening of a different one of the plurality of controllable water outlets.

4. The method of claim 3, wherein each received signal includes a time stamp related to the opening of the relevant one of the plurality of controllable water outlets.

5. The method of claim 1, wherein each of the respective flow characteristic includes a respective stable flow rate.

6. The method of claim 5, further comprising configuring the processor to:
control the at least one flow regulator to impose at least a 10% cut in the flow rate to each of each of the plurality of controllable water outlets, based on the respective stable flow rate; or
control the at least one flow regulator to impose at least a 10% cut in the flow rate, based on respective stable flow rate, to any of the plurality of controllable water outlets whose respective stable flow rate is greater than 7 litres per minute; or
control the at least one flow regulator to cap the flow rate to each of the plurality of controllable water outlets at no more than 7 litres per minute.

7. The method of claim 1, wherein the supply of water is a supply of hot water.

8. The method of claim 5, wherein the water in the supply is heated by a heat pump.

9. The method of claim 1, wherein the installation includes both a supply of cold water and a supply of hot water, and the method is performed in respect of both the hot water supply and the cold water supply.

10. A computer program comprising instructions which, when the program is executed by the processor, cause the processor to carry out the method of claim 1.

11. A non-transitory computer-readable storage medium comprising instructions which, when executed by the processor, cause the processor to carry out the method of claim 1.

12. A method of controlling usage of water from an in-building water supply installation, the in-building water supply installation having been mapped using the method of claim 1:
the method comprising:
identifying with the processor the opening of the particular one of the plurality of controllable water outlets based on the similarity of a detected flow characteristic to a respective flow characteristic; and
controlling with the processor said at least one flow regulator, based on the identification, to control the supply of water to the identified controllable water outlet.

13. The method of claim 12, wherein each of the respective flow characteristic includes a respective stable flow rate, the method further comprising:
using the processor to control the at least one flow regulator to impose at least a 10% cut in the flow rate to each of each of the plurality of controllable water outlets, based on the respective stable flow rate; or
using the processor to control the at least one flow regulator to impose at least a 10% cut in the flow rate, based on respective stable flow rate, to any of the plurality of controllable water outlets whose respective stable flow rate is greater than 7 litres per minute; or
configuring the processor to control the at least one flow regulator to cap the flow rate to each of the plurality of controllable water outlets at no more than 7 litres per minute.

14. The method of claim 12, wherein the supply of water is a supply of hot water.

15. The method of claim 12, wherein the installation includes both a supply of cold water and a supply of hot water, and the method is performed in respect of both the hot water supply and the cold water supply.

16. A processor and memory for use in mapping an in-building water supply installation having:
a source of water;
a plurality of controllable water outlets coupled to the source of water;
in a water flow path between the source of water and the plurality of controllable water outlets, at least one flow measurement device and at least one flow regulator;
the processor being configured for operative connection to the at least one flow measurement device and the at least one flow regulator;
and the memory, operatively coupled to the processor, storing instructions that cause the processor to perform a method of mapping the water supply installation in which method the processor:
processes signals received from the at least one flow measurement device consequent on the opening of a first of the plurality of controllable water outlets at least until a first flow characteristic is determined;
closing of the first of the plurality of controllable water outlets;
repeating the operations for each of the other controllable water outlets of the plurality of controllable water outlets to determine for each controllable water outlet a respective flow characteristic;

thereafter, the processor being configured to:

identify the opening of a particular one of the plurality of controllable water outlets based on the similarity of a detected flow characteristic to a respective flow characteristic; and control said at least one flow regulator, based on the identification, to control a supply of water from the source of water to the identified controllable water outlet.

17. The processor of claim 16 wherein the processor and memory are configured for use in an installation that includes both a source of cold water and a source of hot water, and the memory stores instructions which cause the processor to perform the method in respect of both the source of hot water and the source of cold water.

18. A water supply installation including:
the processor and memory of claim 16;
the source of water;
the plurality of controllable water outlets coupled to the source of water;
in the water flow path between the source of water and the plurality of controllable water outlets, the flow measurement device and the at least one flow regulator;
the processor being operatively connected to the flow measurement device and the at least one flow regulator.

19. The water supply installation of claim 18, wherein the installation includes both a source of cold water and a source of hot water, and the memory stores instructions which cause the processor to perform the method in respect of both the source of hot water and the source of cold water, or wherein the source of water is a source of water heated by an energy storage arrangement based on a phase change material, the energy storage arrangement being coupled to a heat pump.

20. The water supply installation of claim 19, wherein the phase change material has a phase transition temperature within the range 40 to 60 Celsius.

* * * * *